United States Patent [19]

Tillstrom

[11] Patent Number: 5,507,075
[45] Date of Patent: Apr. 16, 1996

[54] EYEGLASS STRAP RETAINER DEVICE

[76] Inventor: Carl R. Tillstrom, 25 Village Dr., Somers Point, N.J. 08244

[21] Appl. No.: 318,136

[22] Filed: Oct. 5, 1994

[51] Int. Cl.[6] ..................................................... A44B 21/00
[52] U.S. Cl. ........................................................... 24/3.3
[58] Field of Search ........................... 24/3.3, 3.4, 115 H, 24/115 G, 299; 351/155–157; 403/291, 300, 303, 304

[56] References Cited

U.S. PATENT DOCUMENTS

| | | | |
|---|---|---|---|
| 1,374,566 | 4/1921 | Hengstenberg | 403/303 |
| 2,819,650 | 1/1958 | Seron | 24/3.3 X |
| 3,588,960 | 6/1969 | McClellan et al. | 24/3 |
| 3,827,790 | 8/1974 | Wenzel | 24/3.3 X |
| 3,874,776 | 4/1975 | Seron | 351/156 X |
| 3,879,804 | 4/1975 | Lawrence | 24/3 |
| 3,979,795 | 9/1976 | Seron | 24/3 |
| 4,752,990 | 6/1988 | Schutte | 24/115 G X |
| 4,965,913 | 10/1990 | Sugarman | 24/3.3 |
| 5,092,668 | 3/1992 | Welch et al. | 351/156 |

FOREIGN PATENT DOCUMENTS 2212293  7/1989  United Kingdom ............. G02C 3/02

*Primary Examiner*—Peter M. Cuomo
*Assistant Examiner*—Robert J. Sandy
*Attorney, Agent, or Firm*—Thomas A. Lennox

[57] ABSTRACT

An eyeglass strap retainer device is constructed of a cord with both terminal sections being formed into loops secured by a metal clasp. Each loop is threaded inside a resilient helical compression spring which is secured in place with the terminal end of the compression spring proximate the terminal end of the loop requiring that the spring be compressed when attached over a temple leg of a pair of eyeglasses.

9 Claims, 1 Drawing Sheet

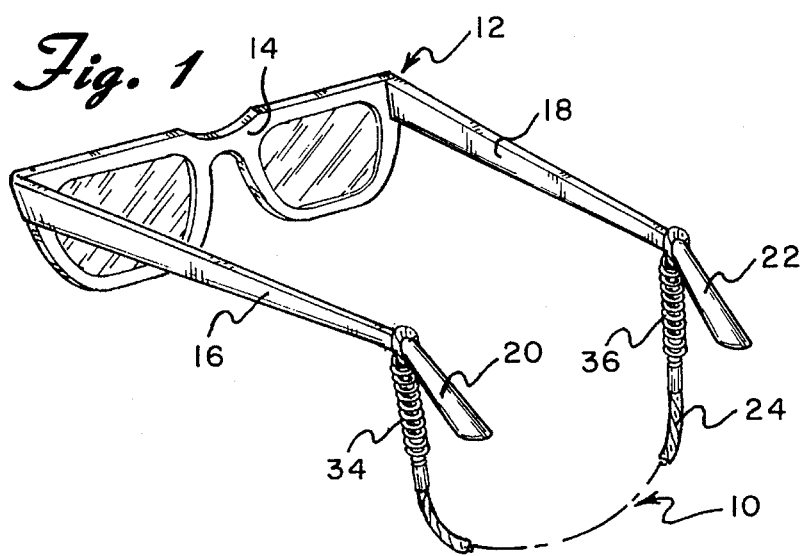
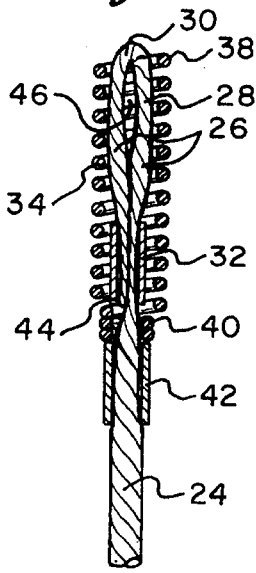
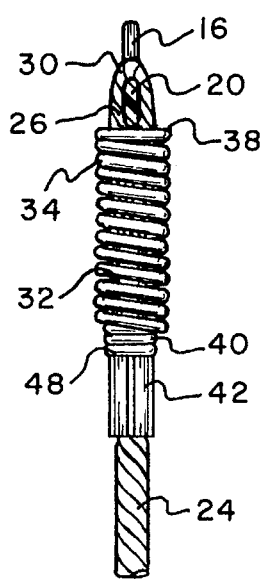
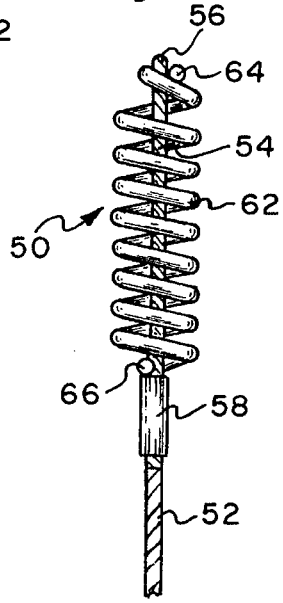
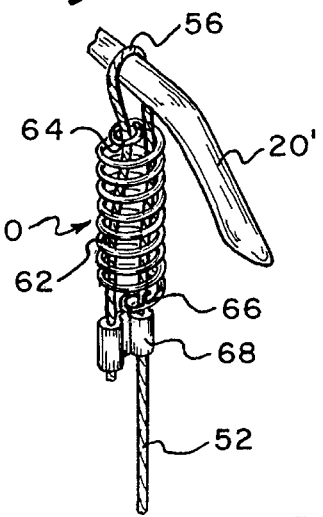
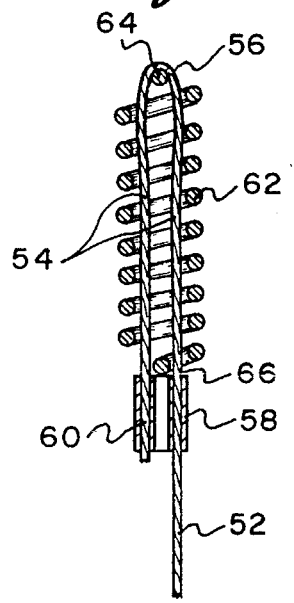

EYEGLASS STRAP RETAINER DEVICE

BACKGROUND OF THE INVENTION

The field of the invention relates to an eyeglass strap retainer device and, more particularly, to an improved attachment device to connect the ends of the cords to the eyeglass temple legs.

The problem of lost glasses is the bane of existence to eyeglass wearers. A common answer is to connect the temple legs of the eyeglasses to a cord which fits over the head and allows the glasses to hang on the wearer's neck when not in use. Unfortunately, in that position, the eyeglasses typically are caught on the wearer's hands or on foreign objects which tend to dislodge the ends of the cord from the temple legs. Common attachment mechanisms utilize a resilient tube or loop to squeeze over the enlarged ends of the temple legs and provide some degree of security. However, in practice, if the resilient loop or tube is of sufficient size to allow it to be forced over the end of the temple leg, it is also large enough to be dislodged inadvertently. Further, the degree of increase in the size of the end of the temple legs from one pair of glasses to another varies widely. Thus, a resilient loop that works on one frame well probably not work on another size frame.

U.S. Pat. No. 5,092,668 to Welch, et al, incorporated herein by reference thereto, describes an eyeglass cord retainer apparatus utilizing an elastic loop with a spring or elongate resilient tubular sleeve around a medial portion of the elastomeric loop. This patent also describes in FIGS. 1 and 2 typical prior art eyeglass cords. In U.S. Pat. No. 3,588,960 to McClellan, et al, a retaining band is described utilizing polyvinyl plastic loops attached to a flexible and and yieldable spring which fits around the wearer's head. In U.S. Pat. No. 3,979,795 to Seron, an eyeglass holder is described utilizing a flexible loop clasp onto which a slider ring is threaded to squeeze a medial portion of the loop. In U.S. Pat. No. 3,879,804 to Lawrence, a neck strap is provided wherein connection to the eyeglass frame is accomplished by a constrictive loop over which a coil of wire defining an opening sufficiently small to grip the strap member, the coil of wire being positioned at the base of the loop or at a median portion of a double loop arrangement to connect the ends of the loop together. In British patent application GB 2212 293 A, a spectacle retaining cord is described having an integral noose configuration of the end of the cord fixed by a closely wrapped coil of wire.

None of these devices provide an effective secured attachment to a variety of sized and shaped temple legs nor attain the objects provided herein below.

SUMMARY OF INVENTION

The term "strap" is used to generically described as a flexible elongate member that can effectively hang around the wearer's neck with the ends attached to the temple legs of eyeglasses. The term "strap" is intended to include a plastic or leather strap, a woven cord or ribbon, a metal, common or precious, chain, a flexible spring, or any other equivalent structure suitable for the use.

It is an object of the present invention to provide an attachment device to connect the ends of an eyeglass strap retainer apparatus to the temple legs of a pair of eyeglasses without depending upon a resilient loop or a resilient tube to provide the security of a connection to the temple legs. The tendency of elastomeric and polymeric materials to lose their gripping power after extensive use coupled with the varying diameters and shapes of the ends of the temple legs of eyeglasses limit the utility of the prior art devices.

It is a particular object of the present invention to provide an attachment mechanism for the ends of an eyeglass cord which is detachable essentially only by the action of the wearer and not by any inadvertent pulling or yanking on the strap.

It is a particular object of the present invention to provide an attachment mechanism for the retainer apparatus such that pulling at it at most angles serves to lock the mechanism in place and virtually prevent its removal. A key element of this locking mechanism is that springs attached on each end of the strap to which terminal loops are threaded, remains in constant compression so long as it is attached to the temple leg of the eyeglasses. Pulling on the strap in almost any direction causes the compressed spring to lock onto the edge of the temple leg and resist removal.

It is a particular object of the present invention to provide attachment mechanisms on retainer straps which allow the strap to be of precious metal and the eyeglasses to be quite expensive.

An aspect of the invention is an eyeglass strap retainer device for use with an eyeglass assembly that includes a central frame and two temple legs extending rearwardly from the central frame, each of the temple legs having a terminal end section. The device includes an elongate flexible strap that includes two terminal end sections, each said terminal section bent back juxtaposed to the strap forming a loop. The device further includes clasp means to frictionally grip each of the terminal sections and the strap to secure the loops, each loop including an opening and a terminal end. The device also includes two resilient helical compression springs, through each of which one of the loops is threaded, each of the springs including a length and a terminal end. The device further includes first stop means proximate each loop to prevent the springs from sliding past a first stop position along the strap in a direction away from the terminal end of the loop, and second stop means proximate each loop to prevent the springs from sliding past a second stop position along the strap in a direction off the terminal end of the loop. The relative positions of the terminal ends of each of the spring and loop combinations, when each of the springs are against the first stop means, require compression of the spring to engage the loop over a terminal end section of the temple leg of the eyeglass assembly.

It is preferred that the second stop means include that the spring further include a section of reduced inside diameter at an end opposite the terminal end of the spring, and that the attachment means include a rigid member wrapped around and frictionally engaged on the loop, the member being inside the spring and having an outside shape larger than the reduced inside diameter section of the spring. It is further preferred that the spring further include an extension section extending across an opening at the terminal end of the spring, and the first stop means include that the terminal end the loop be trained over and outside the extension section, wherein the shape of the extension section prevents the terminal end of the loop from slipping off thus preventing the spring from slipping off the terminal end of the loop. It is also preferred that the strap be a woven cord.

Another aspect of the invention is an eyeglass strap retainer device for use with an eyeglass assembly as above. The device includes an elongate flexible strap including two terminal end sections, each said terminal section bent back juxtaposed to the strap forming a loop. The device further includes clasp means to frictionally grip each of the terminal sections and the strap to secure the loops, each loop including an opening and a terminal end. The device also includes two resilient helical compression springs through each of which one of the loops is threaded, each of the springs including a terminal end. The device further includes attachment means for each spring to prevent the springs from sliding back along the strap away from the terminal ends of the loops, and to prevent the springs from sliding off the terminal ends of the loop. The relative positions of each terminal end of each of the springs and of each of the respective loops are proximate to each other.

It is preferred that the relative positions of the terminal ends of the spring and loop combinations, require compression of the spring to engage the loop over the terminal end section of the temple leg of the eyeglass assembly. It is further preferred that the spring further include a section of reduced inside diameter at an end opposite the terminal end of the spring, and the attachment means includes a rigid member wrapped around and frictionally engaged on the loop, the member being inside the spring and having an outside shape larger than the reduced inside diameter section of the spring.

BRIEF DESCRIPTION OF THE DRAWINGS

FIG. 1 is a perspective view showing a pair of eyeglasses on which an eyeglass cord retainer device of the present invention is attached.

FIG. 2 is a vertical cross-sectional view cutting through the spring and attachment to the end of the cord before it is attached to a temple leg of the eyeglasses.

FIG. 3 is an enlarged side view of the connection mechanism illustrated in FIGS. 1 and 2 showing the attachment to the temple leg.

FIG. 4 is an enlarged cutaway perspective view of a second embodiment of the invention shown attached to a temple leg with the spring shown slightly compressed for illustrative purposes only.

FIG. 5 is a side elevational view thereof showing the device disattached from the temple leg.

FIG. 6 is a vertical cross-sectional view of the attachment device illustrated in FIG. 5.

DESCRIPTION OF PREFERRED EMBODIMENTS

Eyeglass strap retainer device 10 is illustrated in FIG. 1 attached on temple legs 16 and 18 of eyeglass 12. The temple legs extend rearwardly from central frame 14 terminating at terminal end sections 20 and 22, respectively. Device 10 is constructed of a one to three foot strap, commonly about 24 inches in length. Strap 24 is a woven nylon cord that may be constructed of any suitable fiber. Springs 34 and 36 are attached at the terminal section of strap 24. In the vertical cross-sectional cutaway view shown in FIG. 2, spring 34 is shown with terminal section 26 of strap 24 bent backward and juxaposed against each other to form loop 28 which is threaded inside spring 34. Loop 28 is fixed in place by steel compression ring 32 which tightly clasps the end of the strap and the adjacent section of the terminal section of the strap together to secure the loop. Helical spring 34 has terminal end 38 which is proximate terminal end 30 of loop 28. Opposite end 40 of spring 34 is of a reduced diameter such that it engages edge 44 of clasp 32 and prevents spring 34 from being pulled off end 30 of the loop. Steel clasp 42 is frictionally and securely attached to strap 24, again of a sufficiently large diameter to prevent spring 34 from sliding along strap 24 away from terminal end 30. This stop is very important as illustrated in FIG. 3 as spring 34 is compressed reduced diameter end section 40 abuts end 48 of clasp 42 allowing the spring to be compressed. As shown in FIG. 3, the connection mechanism of device 10 is attached all over terminal section 20 of temple leg 16. Terminal section 20 has been inserted into opening 46 of loop 28 which requires compression of spring 34 by bearing down on terminal end 38 of the spring. Thus, while the device is attached to the eyeglasses, springs 34 and 36 are in constant compression. Attempts to yank device 10 from the eyeglasses results in a locking of the spring end against the terminal sections of the temple legs, virtually preventing inadvertent disengagement.

A connection mechanism 50 of a second embodiment is illustrated in FIGS. 4, 5, and 6. In FIG. 4, connection mechanism 50 is shown attached to terminal end section 20 prime of an eyeglass temple leg. Spring 62 is shown compressed for illustrative purposes as terminal end 64 of spring 62 would normally be engaged and pressing against end 20 prime. As shown in FIG. 5, with temple end section 20 prime removed, spring 62 is at rest and terminal end 64 of the spring is proximate end 56 of loop 54. Thus, in order to engage the attachment device on the temple leg, spring 62 would, of necessity, have to be compressed and would remain in that condition while attached to the temple leg. In this embodiment, as far shown in FIG. 6, spring 62 is prevented from sliding off end 56 of the loop by end extension section 64 which extends across the terminal opening of spring 62 to hook terminal end 56 of the loop thus preventing the spring from sliding in that direction. Likewise, at the opposite end of spring 62, extension section 66 extends through loop 54 and abuts metal clasp 58 which not only secures the loop by gripping end 60 of cord 52, but also prevents spring 54 from sliding away from terminal end 56 of the loop.

Helical springs 34 and 36 are preferably one-eighth to one-quarter inch in diameter and about one inch in length. The preferred diameter is three-sixteenths of an inch, and is preferably constructed of spring tempered stainless steel eighteen gauge wire. The terminal end of the springs may extend slightly past the terminal end of the respective loops or may be slightly shorter than the terminal end of the loops. All that is required is that the spring be compressed when the temple leg is attached gripping and locking onto the temple leg.

In the method of assembly, springs 34 and 36 are placed over strap 24 with terminal ends 38 facing outwardly. Loops 28 are formed and fixed in place by brass compression clasps 32. Steel clamps may also be used. Helical springs 34 and 36 are slid outward over loops 28 and stopped by edges 44 of clasps 32. Brass clasps 42 are now attached to strap 24 preventing springs 34 and 36 from sliding inwardly over the strap. In use, easily compressable springs 34 and 36 expose the loop's terminal ends. The loops are then slipped over the temple legs. Releasing the springs produces constant spring pressure and locks the devices on the temple legs.

While this invention has been described with reference to specific embodiments disclosed herein, it is not confined to the details set forth and the patent is intended to include modifications and changes which may come within and extend from the following claims.

I claim:

1. An eyeglass strap retainer device for use with an eyeglass assembly comprising a central frame and two temple legs extending rearwardly from the central frame, each of the temple legs having a free end section, the device comprising:

(a) an elongate flexible strap comprising two terminal end sections, each of said terminal end sections bent back juxtaposed to the strap forming a loop, (b) clasp means to frictionally grip each of the terminal end sections and the strap to secure the loops, each loop comprising an opening and an end, (c) two resilient helical compression springs, through each of which one of the loops is threaded, each of the springs comprising a length and a terminal end, (d) first stop means proximate each loop to prevent the springs from sliding past a first stop position along the strap in a direction away from the loop end, and (e) second stop means proximate each loop to prevent the springs from sliding past a second stop position along the strap in a direction off the loop end, wherein the relative positions of the terminal ends of each of the spring and loop end combinations, when each of the springs are against the first stop means, require compression of the spring to engage the loop over a free end section of the temple leg of the eyeglass assembly.

2. The device of claim 1 wherein the second stop means comprises that the spring further comprise a section of reduced inside diameter at an end opposite the terminal end of the spring, and that the clasp means comprise a rigid member wrapped around and frictionally engaged on the loop, the member being inside the spring and having an outside shape larger than the reduced inside diameter section of the spring.

3. The device of claim 1 wherein the spring further comprises an extension section extending across an opening at the terminal end of the spring, and the first stop means comprises that the terminal end the loop be trained over and outside the extension section, wherein the shape of the extension section prevents the loop end from slipping off thus preventing the spring from slipping off the loop end.

4. The device of claim 1 wherein the strap is a woven cord.

5. An eyeglass strap retainer device for use with an eyeglass assembly comprising a central frame and two temple legs extending rearwardly from the central frame, each of the temple legs having a free end section of a cross-sectional shape, the device comprising:

(a) an elongate flexible strap comprising two terminal end sections, each of said end sections bent back juxtaposed to the strap forming a loop, (b) clasp means to frictionally grip each of the terminal end sections of the strap to secure the loops, each loop comprising an opening and an end, (c) two resilient helical compression springs through each of which one of the loops is threaded, each of the springs comprising a terminal end, (d) attachment means for each spring to prevent the springs from sliding back along the strap away from the loop end, and to prevent the springs from sliding off the loop end, wherein the relative positions of each terminal end of each of the springs and of each loop end are proximate to each other.

6. The device of claim 5 wherein the strap is a woven cord.

7. The device of claim 5 wherein the relative positions of the terminal end of the spring and loop end combinations, require compression of the spring to engage the loop over the free end section of the temple leg of the eyeglass assembly.

8. The device of claim 5 wherein the spring further comprises a section of reduced inside diameter at an end opposite the terminal end of the spring, and the clasp means comprises a rigid member wrapped around and frictionally engaged on the loop, the member being inside the spring and having an outside shape larger than the reduced inside diameter section of the spring.

9. The device of claim 5 wherein the spring further comprises an extension section extending across an opening at the terminal end of the spring, and the attachments means comprises that the loop end be trained over and outside the extension section, wherein the shape of the extension section prevents the loop end from slipping off thus preventing the spring from slipping off the loop end.

* * * * *